United States Patent
Goetz

(10) Patent No.: US 8,656,413 B2
(45) Date of Patent: Feb. 18, 2014

(54) ON-DEMAND WRAPPERS OF APPLICATION DATA

(75) Inventor: Oliver Goetz, Altrip (DE)

(73) Assignee: SAP AG, Walldorf (DE)

( * ) Notice: Subject to any disclaimer, the term of this patent is extended or adjusted under 35 U.S.C. 154(b) by 1585 days.

(21) Appl. No.: 11/585,533

(22) Filed: Oct. 24, 2006

(65) Prior Publication Data

US 2008/0148292 A1    Jun. 19, 2008

(51) Int. Cl.
*G06F 9/44* (2006.01)
*G06F 9/46* (2006.01)
*G06F 13/00* (2006.01)

(52) U.S. Cl.
USPC ............. 719/320; 714/15; 709/217; 709/218; 709/227; 709/228; 709/229

(58) Field of Classification Search
None
See application file for complete search history.

(56) References Cited

U.S. PATENT DOCUMENTS

| | | | |
|---|---|---|---|
| 5,809,250 A * | 9/1998 | Kisor | 709/227 |
| 7,552,219 B2 * | 6/2009 | Polozoff | 709/227 |
| 2006/0089990 A1 * | 4/2006 | Ng et al. | 709/227 |
| 2007/0088831 A1 * | 4/2007 | Pallamreddy et al. | 709/227 |

OTHER PUBLICATIONS

Bill Hines, Tom Alcott, Roland Barcia, Keys Botzum; IBM® WebSphere®: Deployment and Advanced Configuration; IBM Press; Aug. 26, 2004; portions from Chapter 22; 11 pages.*
IBM; IBM WebSphere Information Integrator: Accessing and integrating diverse data for the on demand business; Jan. 2005; 28 pages.*
Simon Brown et al; Professional JSP, 2nd Edition; Apr. 2001; original 1233 pages; excerpted 158 pages containing chapters 3, 5, and 24.*

* cited by examiner

*Primary Examiner* — H S Sough
*Assistant Examiner* — Kimberly Jordan
(74) *Attorney, Agent, or Firm* — Mintz, Levin, Cohn, Ferris, Glovsky and Popeo, P.C.

(57) ABSTRACT

A wrapper can receive a request for application data. The wrapper wraps a first reference to an cross-session object and a second reference to a wrapper mapper object. Thereafter, the cross-section object can be accessed using the first reference and the wrapper mapper object is polled using the second reference to access a session-local object. Related apparatus, systems, methods, and articles are also described.

15 Claims, 15 Drawing Sheets

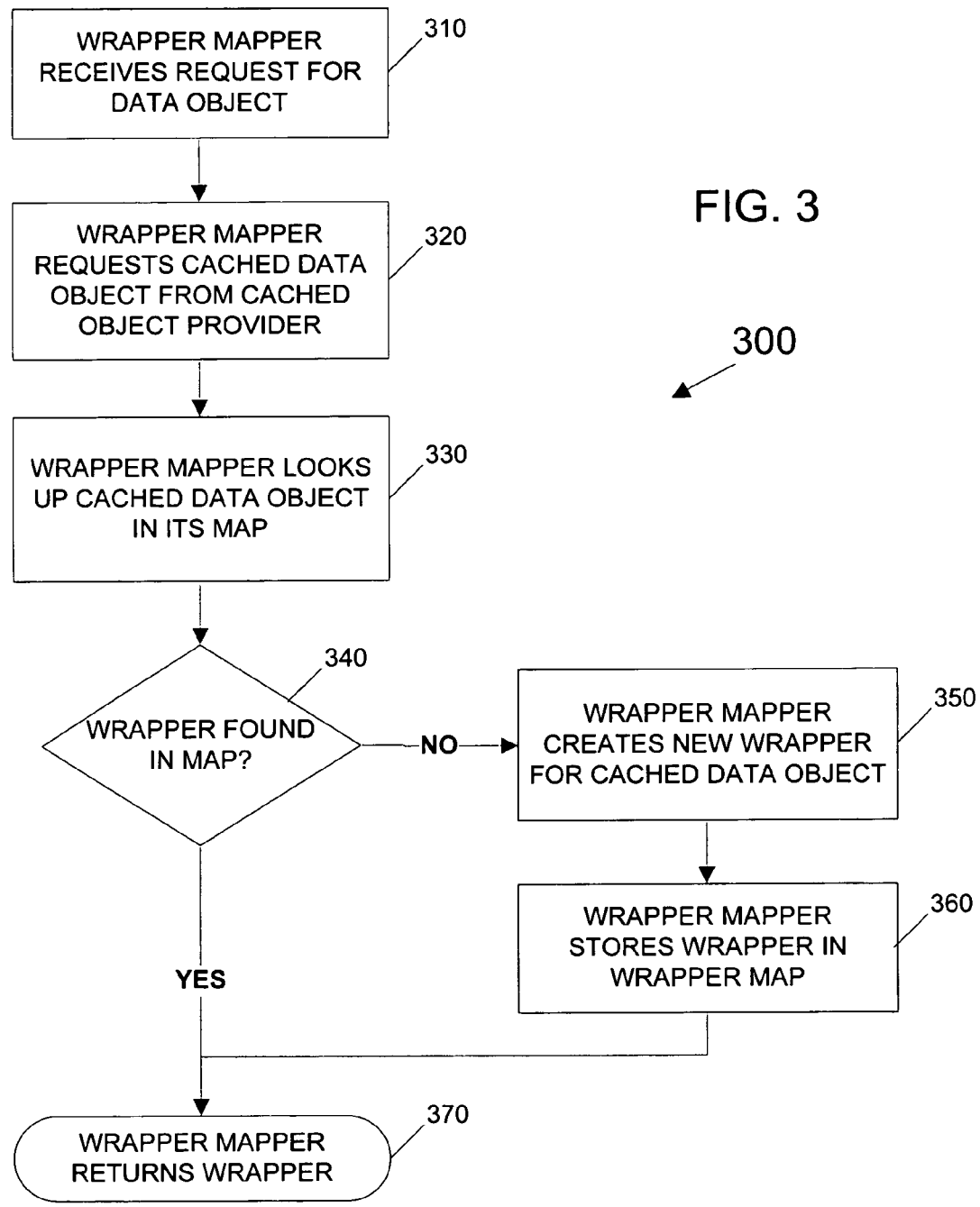

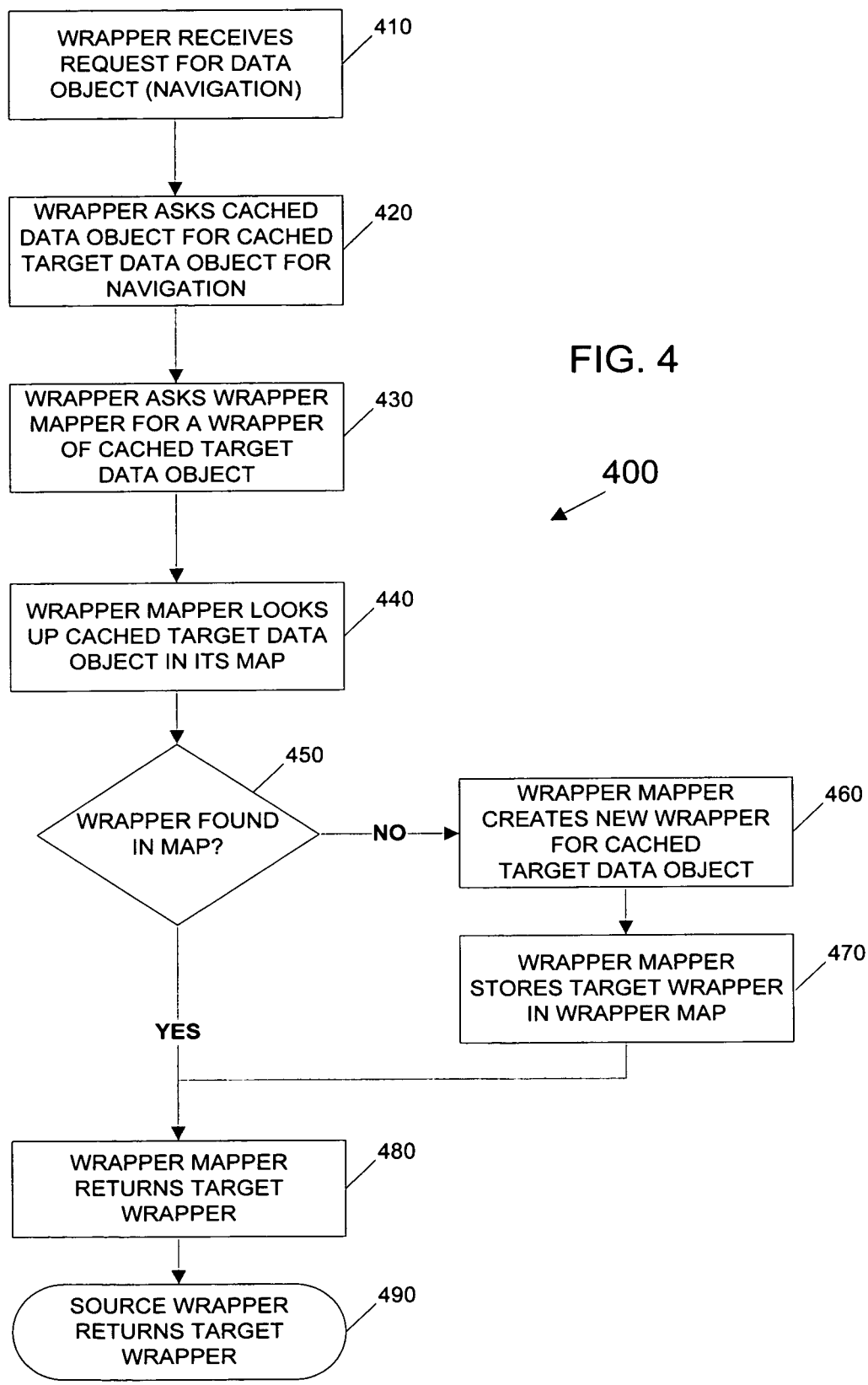

ON-DEMAND WRAPPERS OF APPLICATION DATA

TECHNICAL FIELD

The subject matter described herein relates to thin on-demand wrappers of non-volatile application data.

BACKGROUND

In server environments with numerous users running the same application, non-volatile application data, such as metadata, is often similar in most of such user sessions. However, such application data is not identical thereby necessitating data to be session-local. As a result, duplicative data is stored for the user sessions which results in unnecessarily high memory consumption.

With some conventional server environments, wrappers have been utilized which can act as an interfaces between a caller of the wrapper and code wrapped within the wrapper. In particular, a wrapper can be used as a small size data object that contains a reference to data that is used by many sessions (cross-session data) and a reference to data that is only used for a particular session associated with the wrapper (session-specific data). If data is organized in a graph in which every data object has a map of multiple references to other data objects, such maps must be copied into the wrappers (based on a requirement that the wrapper reference peer data objects of the same session). Such maps can become lengthy and also result in increased memory consumption. Moreover, if wrappers for a whole graph are created, many of the data objects do not get used and so the wrappers for such data objects also unnecessarily consume memory.

SUMMARY

In one aspect, a wrapper storing a first reference to a cross-session object and a second reference to a wrapper mapper object can receive a request for application data (e.g., metadata, etc.). Thereafter, a cross-session object can be accessed using the first reference and a wrapper mapper object can be polled or otherwise accessed using the second reference to access a session-local object.

The polling can, in some variations, include returning, by the wrapper mapper object, a data object wrapper referencing the session-local object, and accessing the session-local object using the data object wrapper. Moreover, the wrapper mapper object can comprise a map associating session-local objects with references. If it is determined that a data object wrapper associated with the second reference does not exist (e.g., using the map, etc.), a data object wrapper storing the session-local object can be generated, and such a data object wrapper can be returned to allow for access of the session-local object using a reference in the data object wrapper.

In another aspect, within a session, there can be a wrapper mapper object which holds a map with all cross-session data objects for which a wrapper has been created in the session as a key and the created wrappers as a value. Every wrapper only holds a reference to an original object which is wrapped by it and a reference to the wrapper mapper object. If a referenced object is to be accessed, the wrapped object is queried for a matching cross-session object. The wrapper mapper object is then queried for a session-local wrapper for the cross-session object. The wrapper mapper object looks up the cross-session object in its map. If the wrapper mapper object finds that a wrapper was previously created for the object, a reference to the wrapper is provided. Otherwise, a wrapper is created and placed within the map.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, in the Enterprise Services Framework (ESF) of SAP NetWeaver, large amounts of metadata can be loaded into the memory of a Java application server. The current subject matter significantly lowers overall memory consumption for application such as Web Dynpro Pattern applications or other ESF applications. In particular, memory consumption is reduced by having wrappers contain two object references and by only creating objects which are being used by an application. In addition, if data has to be fetched from a remote server, maintaining the data in a cross-session cache drastically improves performance by obviating a time consuming remote call. Moreover, the techniques described herein can be used with any object-oriented programming languages as well as other areas in which large amounts of metadata is used that has associated session specific data.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3 is a process flow diagram illustrating a wrapper mapper acting as a data object provider;

FIG. 4 is a process flow diagram illustrating navigation from a first data object wrapper to a second data object wrapper.

Like reference symbols in the various drawings indicate like elements.

DETAILED DESCRIPTION

Figure 1:
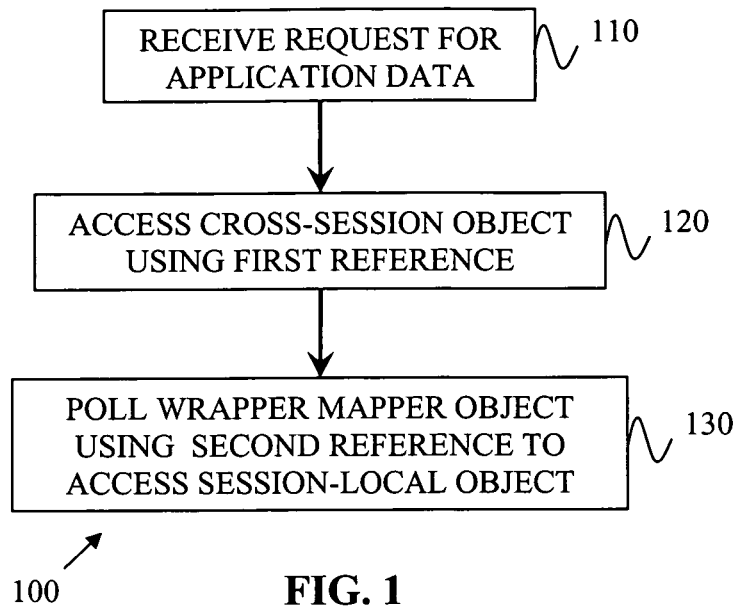
FIG. 1 is a process flow diagram illustrating a method of generating on-demand wrappers of application data.

FIG. 1 is a process diagram illustrating a method 100 in which, at 110, a wrapper storing a first reference to a cross-session object and a second reference to a wrapper mapper object receives a request for application data. Thereafter, at 120, a cross-session object is accessed using the first reference and, at 130, a wrapper mapper object is polled using the second reference in order to access a session-local object.

Figure 2A:
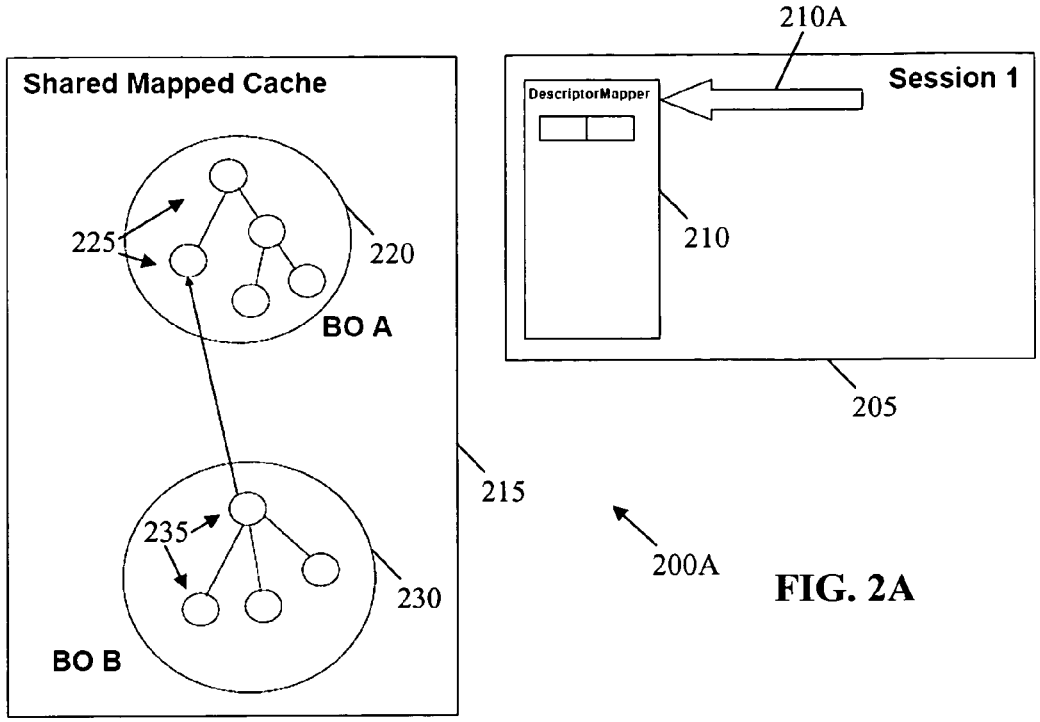
FIGS. 2A-2S are diagrams illustrating creation of on-demand wrappers of application data.
Figure 2B:
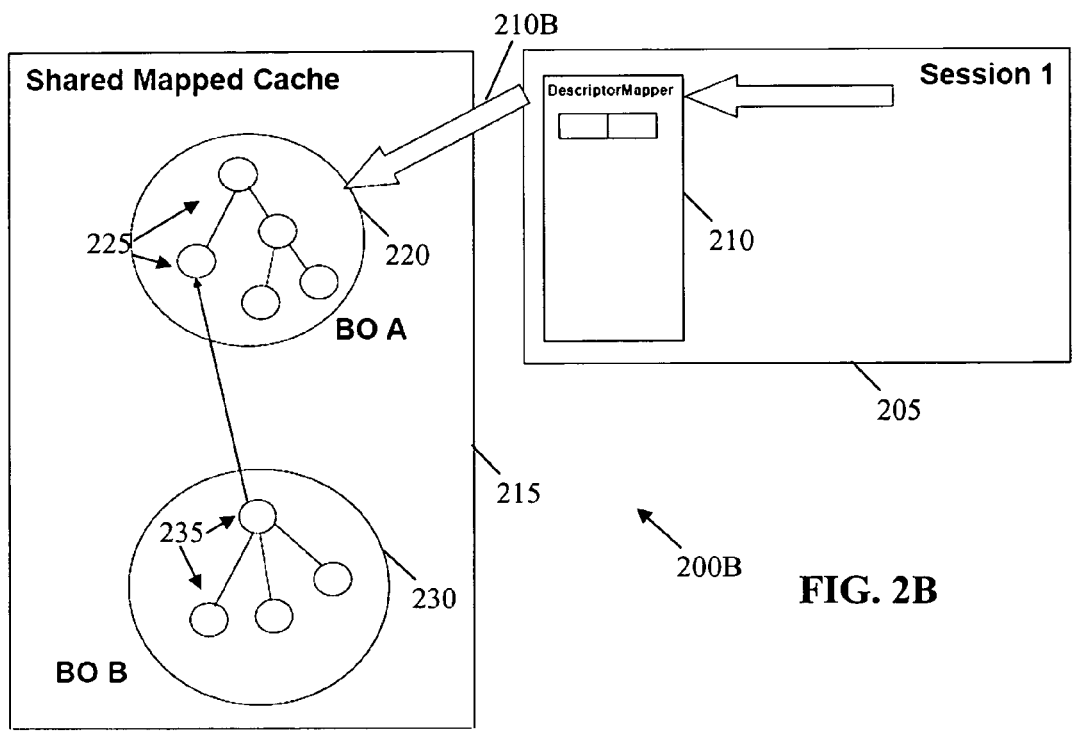
Figure 2C:
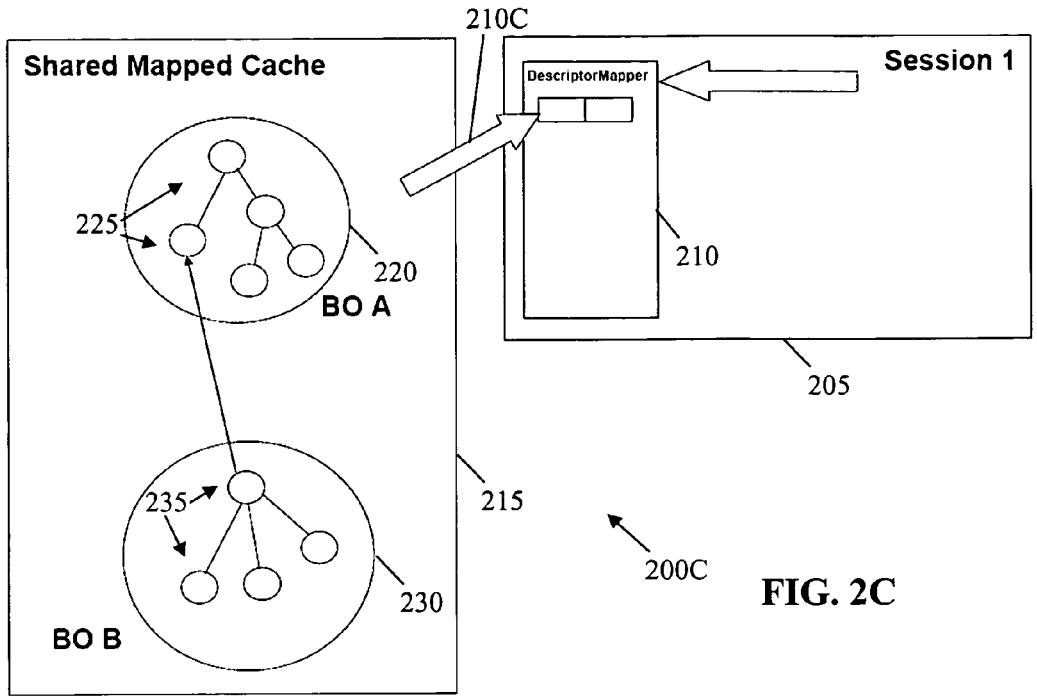
Figure 2D:
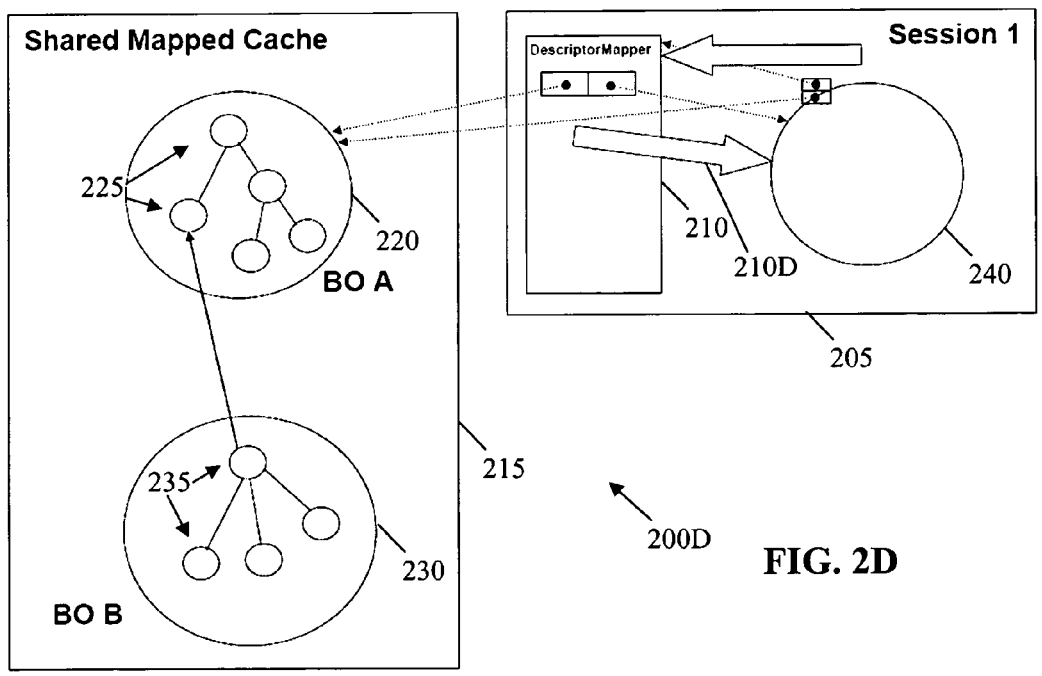
Figure 2E:
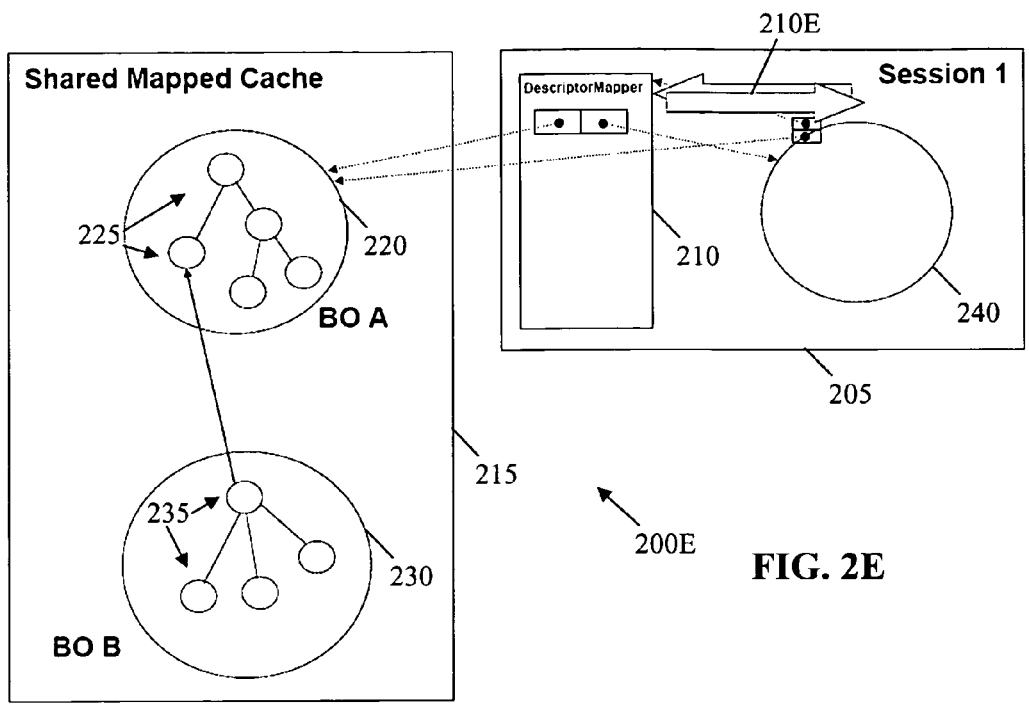
Figure 2F:
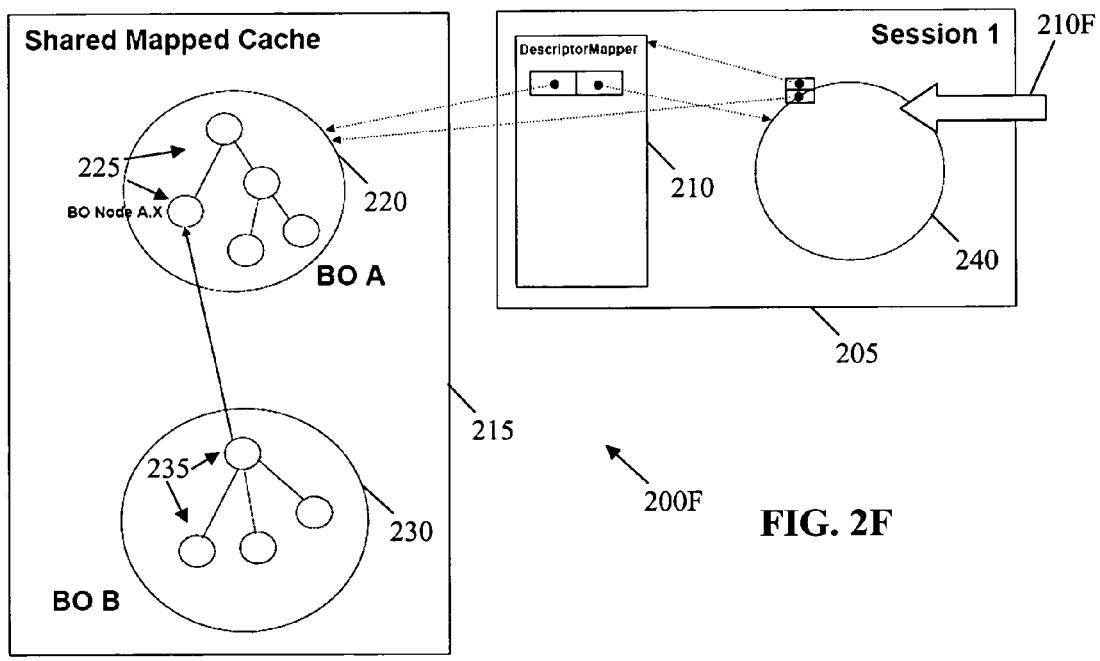
Figure 2G:
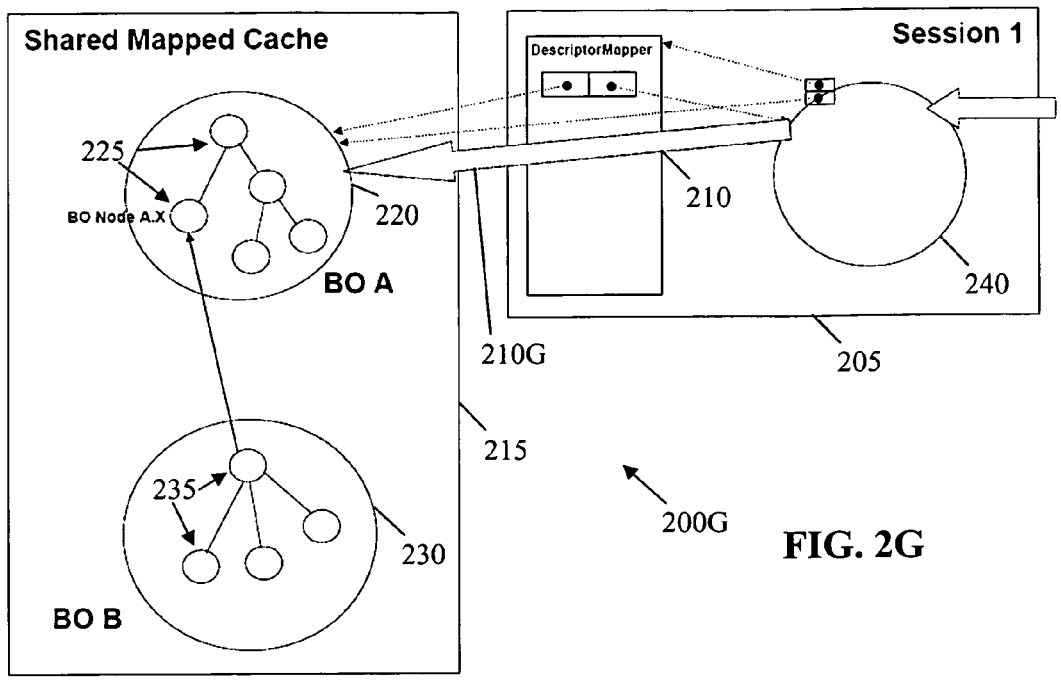
Figure 2H:
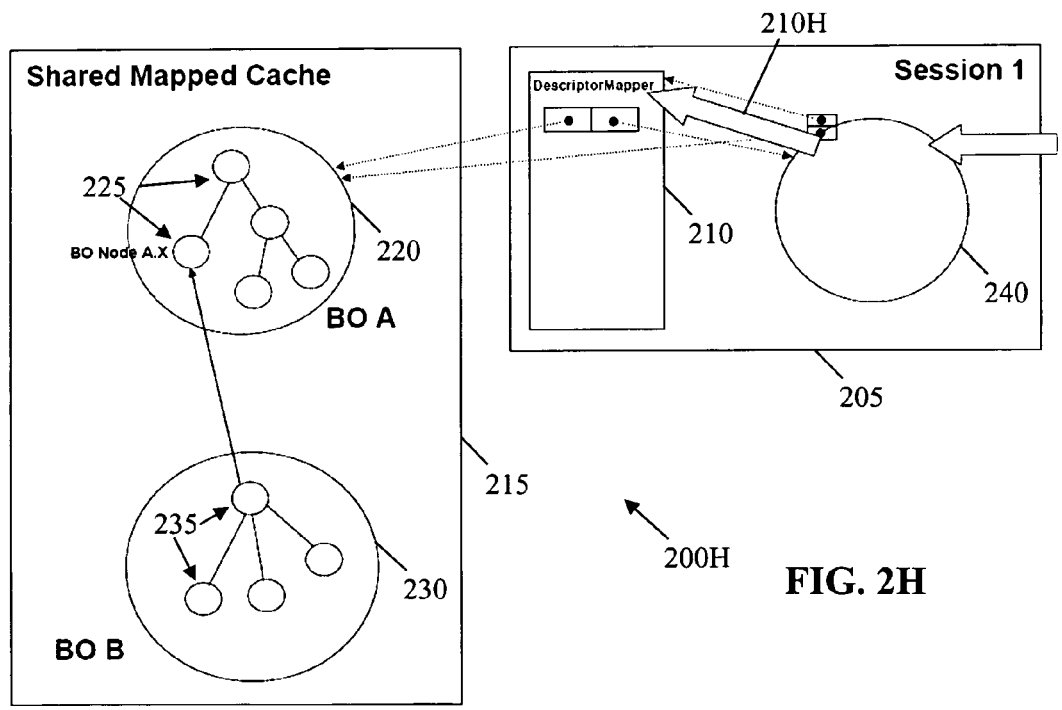
Figure 2I:
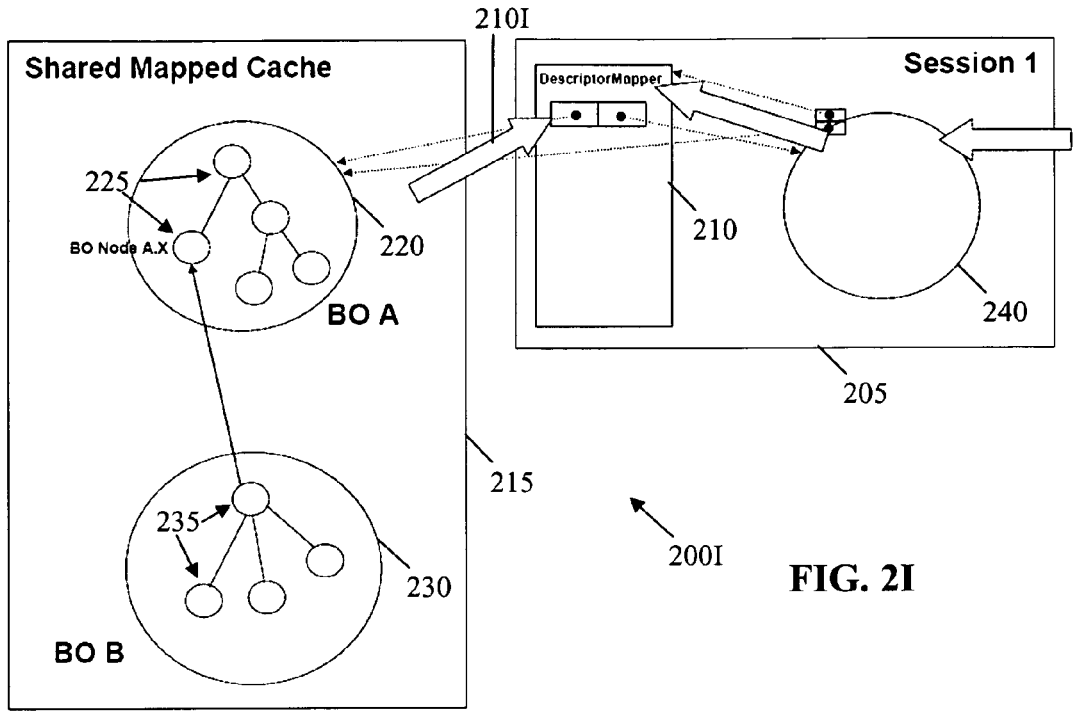
Figure 2J:
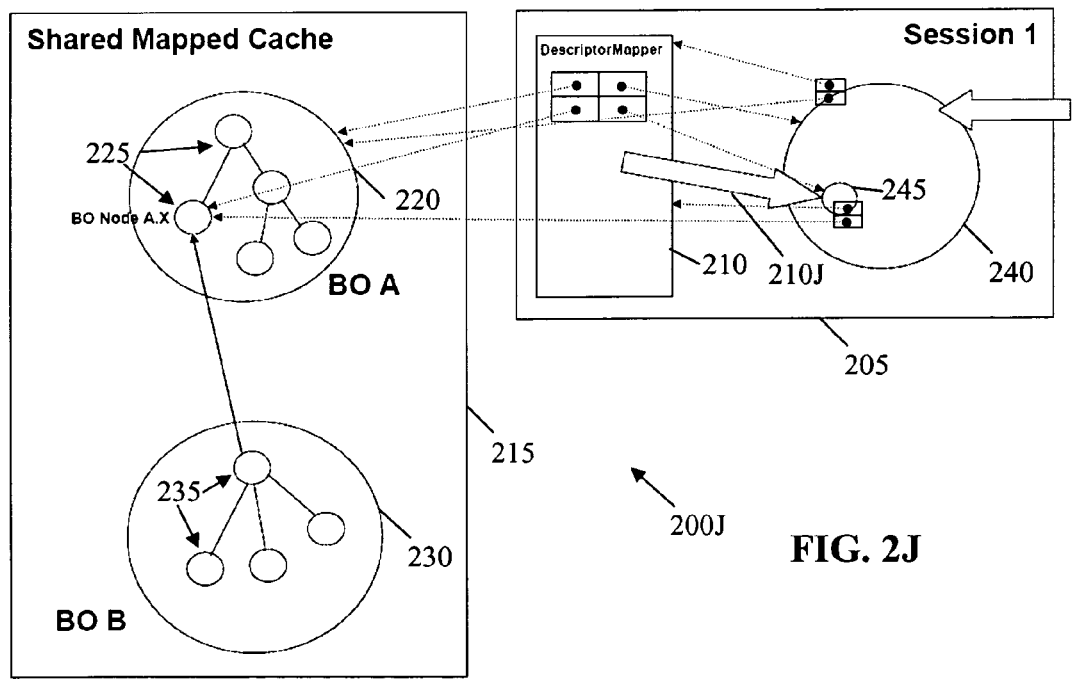
Figure 2K:
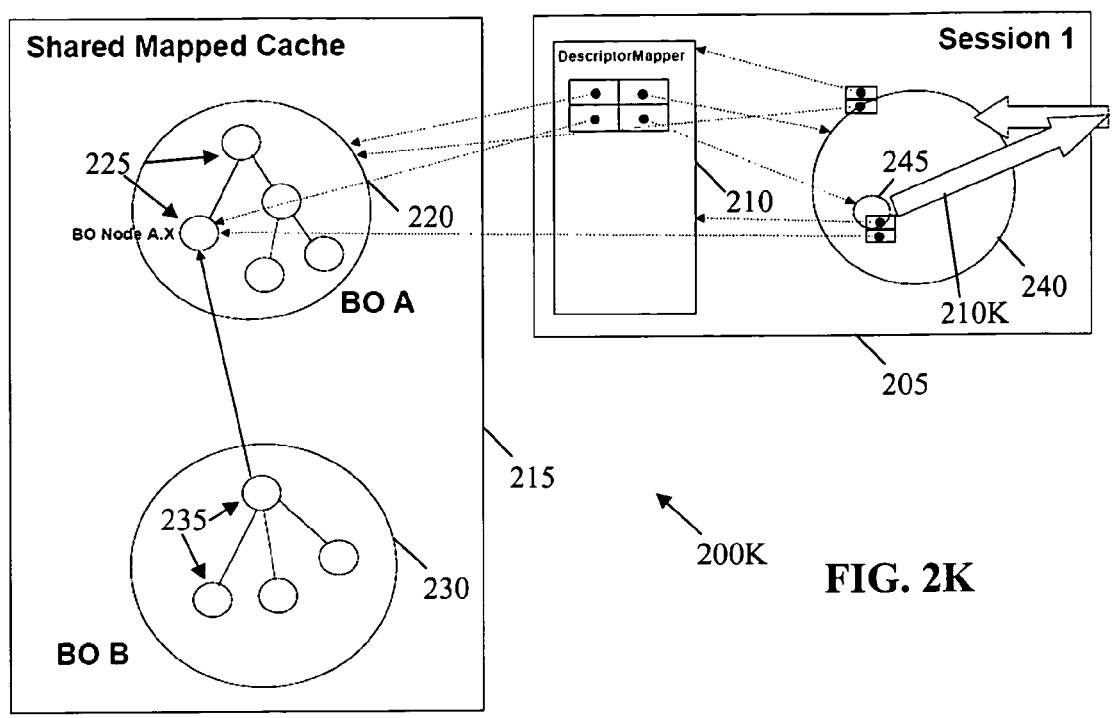
Figure 2L:
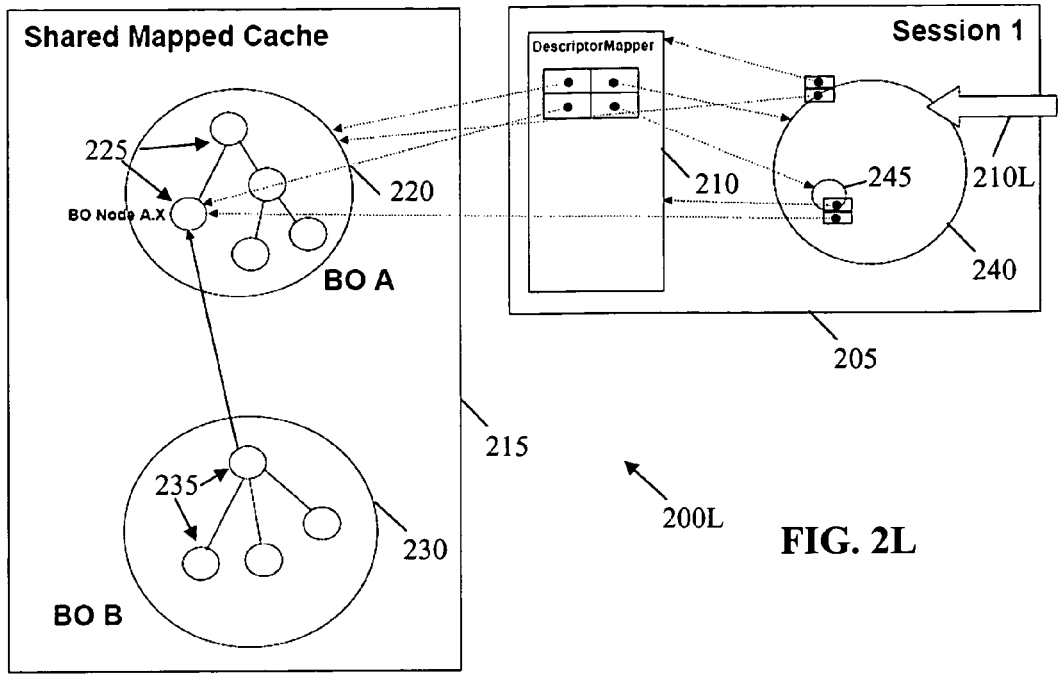
Figure 2M:
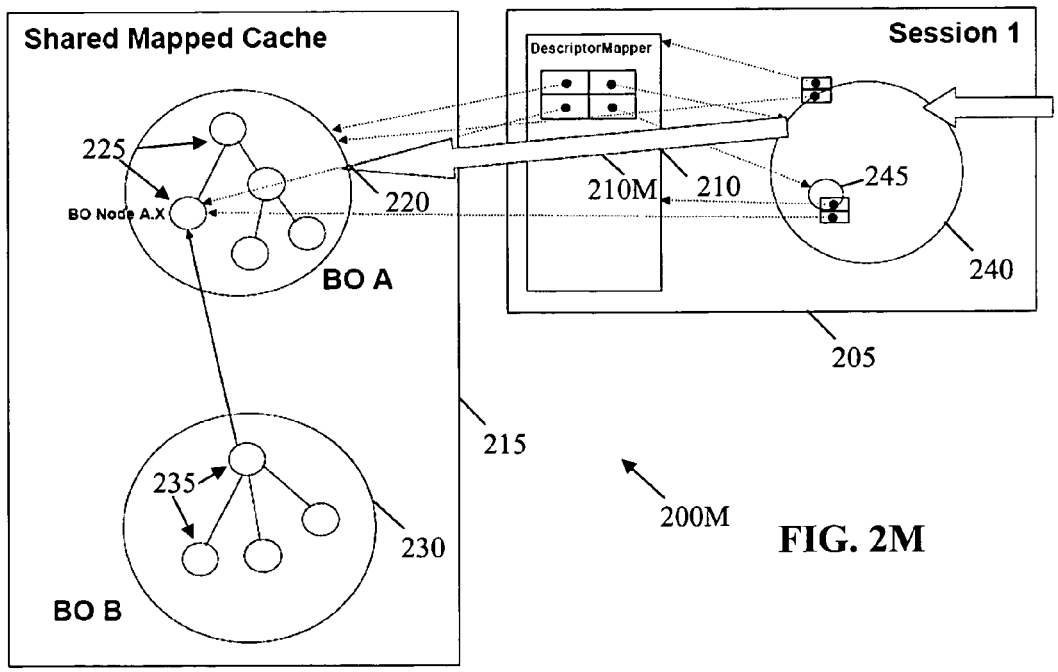
Figure 2N:
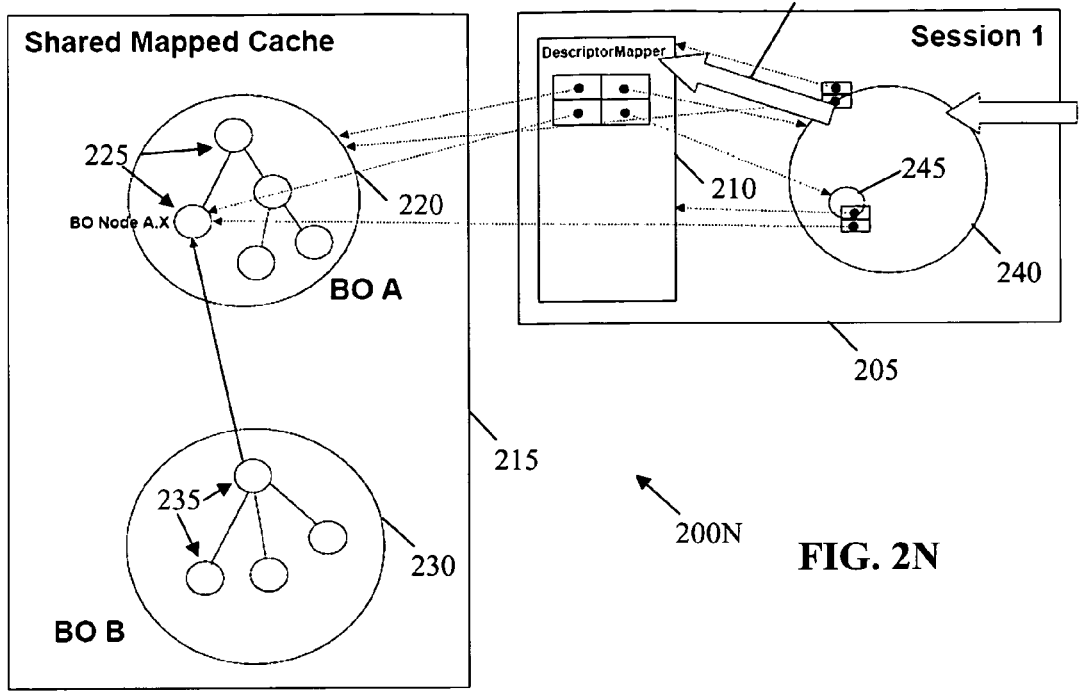
Figure 2O:
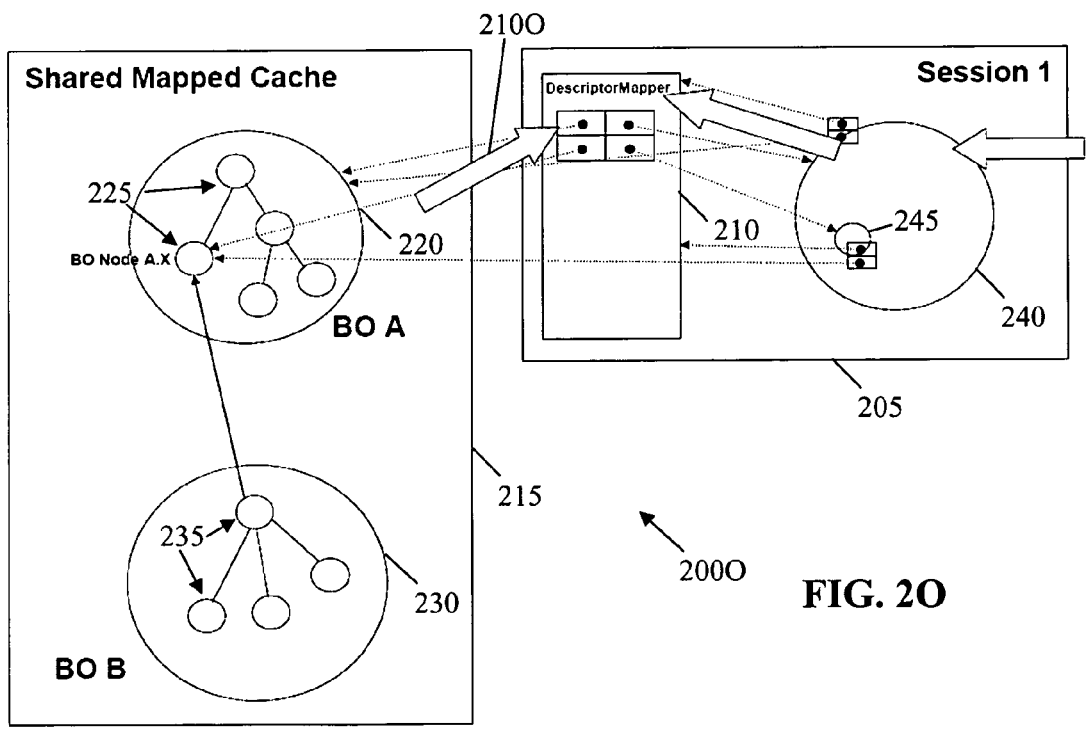
Figure 2P:
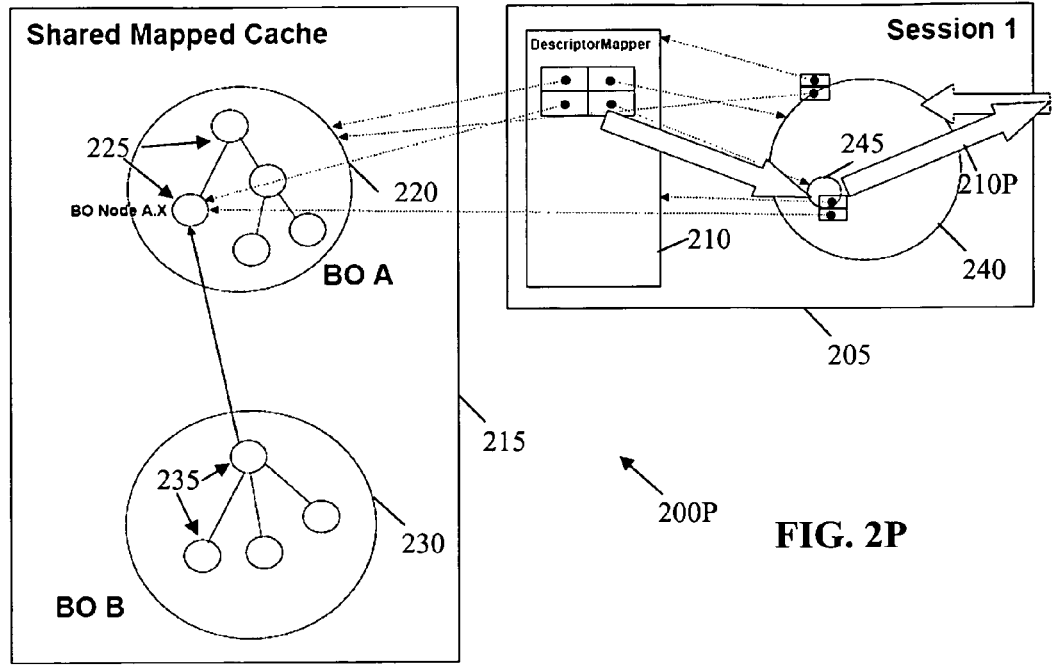
Figure 2Q:
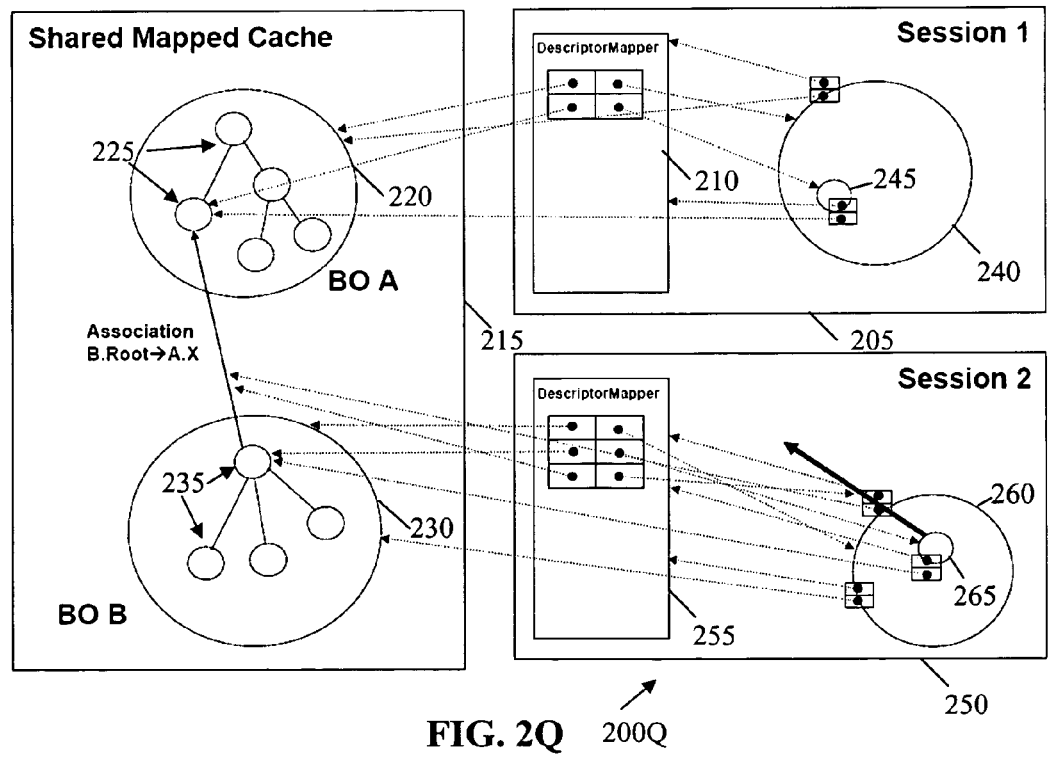
Figure 2R:
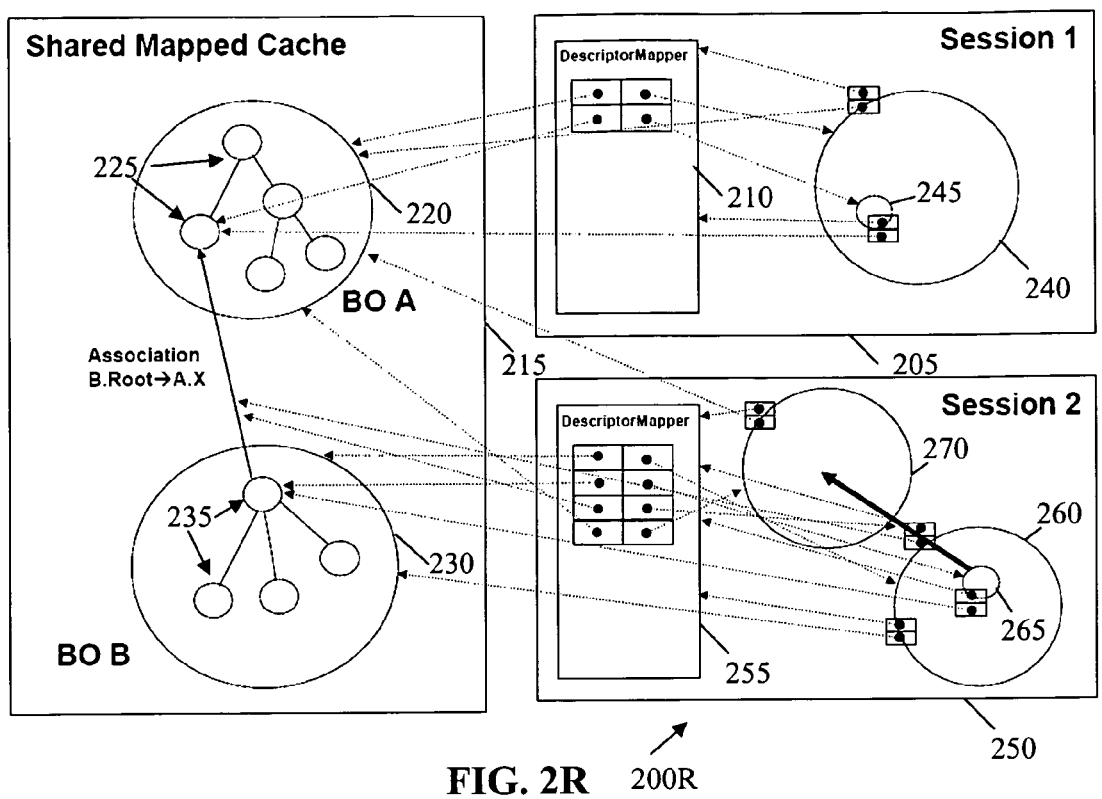
Figure 2S:
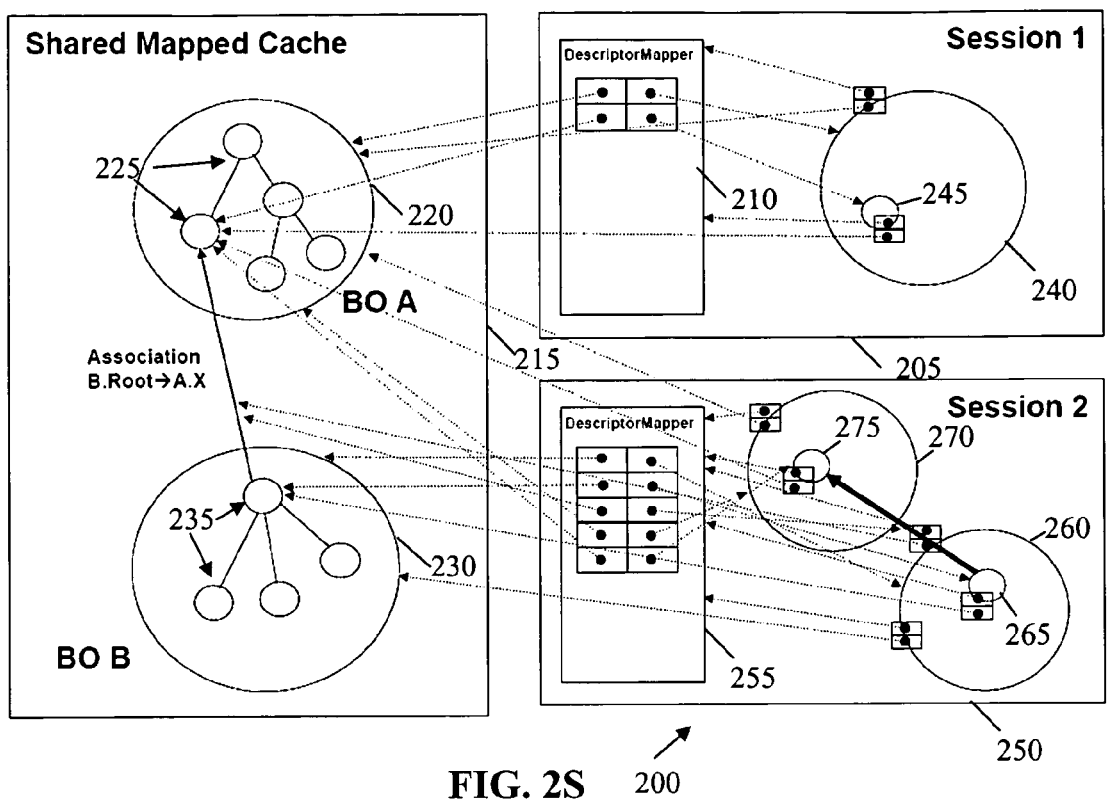

FIGS. 2A-2S are diagrams 200A-200S illustrating a first session 205 of an application in a server environment (with a plurality of concurrent sessions) that includes a wrapper mapper object 210. The wrapper mapper object 210 can include a map with all cross-session data objects for which a wrapper has been created as a key and the created wrappers as a value. A shared mapped cache 215 includes business objects A 220 and business object B 230 which are linked together and which respectively include hierarchically arranged nodes 225, 235.

With reference to FIG. 2A, at 210A, business object A 220 is requested from the wrapper mapper object 210. Thereafter, at 210B, a reference to cached business object A 220 is retrieved. The contents of wrapper mapper object 210, at 210C is then checked to see if there is a wrapper for business object A 220. If there is no wrapper, then, at 210D, a BO wrapper 240 is created and reference to the wrapper is stored in a map within the wrapper mapper object 210. The wrapper mapper object 210 then returns, at 210E, a reference to the newly created BO wrapper 240.

The BO wrapper 240 can receive a request, at 210F, for data from one of the nodes 225 of business object A 220. A wrapped reference (e.g., descriptor, etc.) in the BO wrapper 240 is then accessed, at 210, to obtain a reference to cached node 225 of business object A 220 (which is a cross-session object). The wrapper mapper object 210 is then polled, at 210H, to obtain a BO node wrapper for the cached node 225 of business object A. A map within the wrapper mapper object 210 is checked, at 210I, to see if a wrapper has already been created. If a wrapper has not been created, then at 210J, a BO node wrapper 245 is created and it is stored in the wrapper mapper object 210 map. Thereafter, at 210K, a reference to the BO node wrapper 245 is returned.

In response to receipt, at 210L, of a subsequent request for the cached node 225 of business object A 220, a wrapped reference (e.g., descriptor, etc.) is asked, at 210M, for the cached node 225 of business object A 220. In addition, at 210N, the wrapper mapper object 210 is asked for the BO node wrapper 245 for the cached node 225 of business object A. A map within wrapper mapper object 210 is then checked, at 210O, to see if there is a related wrapper. As the BO node wrapper 245 has already been referenced in the map of wrapper mapper object 210, at 210P, the reference is returned.

FIGS. 2Q-2S illustrate diagrams 200Q-200S in which a mapper instance in a second session works independently from an instance in a first session, and in the second session, new instances are created. In addition, these figures illustrate that a wrapper in a second session can point to cached data objects that are pointed to an existing wrapper in a first session. With such an arrangement, there is a second session 250 having a second wrapper mapper object 255 and a second wrapper 260 which contains a second BO node wrapper 265 referencing nodes 235 of business object B. A third BO wrapper 270 can be created if data from business object A 220 is required in the second session 245 and a third BO node wrapper 275 to reference nodes 225 of business object A.

FIG. 3 is a process flow diagram illustrating a method 300 in which a wrapper mapper is asked for a data object in its role as data object provider. At 310, the wrapper mapper receives a request for a data object. Thereafter, at 320, the wrapper mapper requests a cached data object from a cached object provider. In addition, at 330, the wrapper mapper looks up the cached data object in its map. If the wrapper is found in the map at 340, then the wrapper mapper returns, at 370, the wrapper to the cached data object. Otherwise, the wrapper mapper, at 350, creates a new wrapper for the cached data object and the wrapper mapper, at 360, stores the wrapper in the wrapper map so that the wrapper can be subsequently returned at 370.

FIG. 4 is a process flow diagram illustrating a method 400 in which a wrapper is asked for a data object in its role as data object provider. A wrapper, at 410, receives a request for a data object in connection with an initial navigation. As a result, the wrapper, at 420, asks a cached data object for a cached target data object for the navigation. In addition, the wrapper, at 430, asks a wrapper mapper for a wrapper of the cached target data object. The wrapper mapper then, at 440, looks up the cached target data object in its map. If the wrapper is found in the map at 450, the wrapper mapper, at 460, returns the target wrapper and at 480, the source wrapper, at 490 returns the target wrapper. If a wrappers is not found in the map at 450, then the wrapper mapper, at 460, creates a new wrapper for the cached target data object and the, at 470, stores the target wrapper in the wrapper map so that, at 480, the target wrapper can be returned by the wrapper mapper, and the source wrapper can subsequently, at 480 return the target wrapper.

Figure 5:
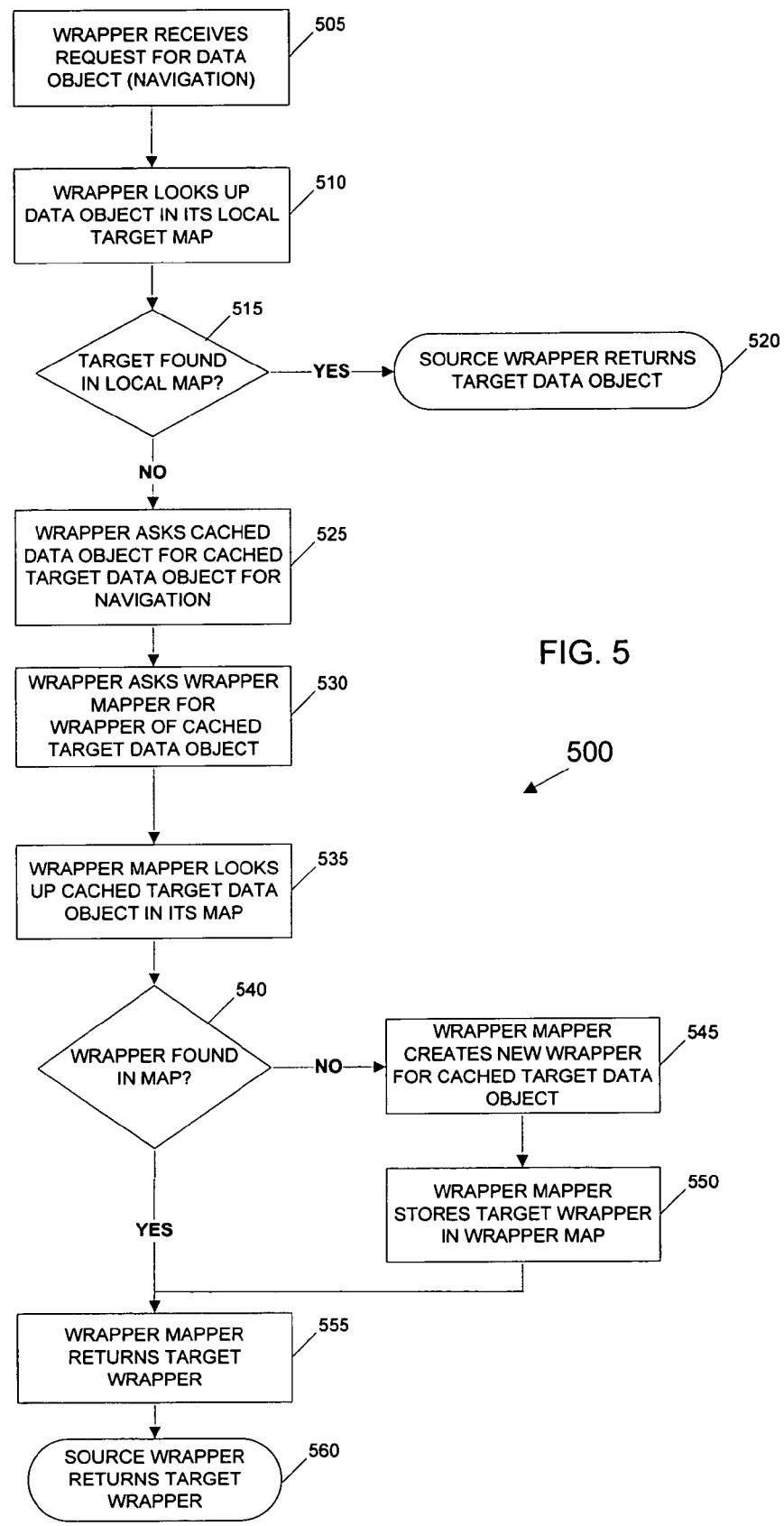
FIG. 5 is a process flow diagram illustrating navigation from a first object wrapper holding a map of local navigation targets to a second data object wrapper.

FIG. 5 is a process flow diagram illustrating a method 500 in which a wrapper is asked for a data object in its role as data object provider and the wrapper holds map of local navigation targets that are only visible in the local session. A wrapper, at 505, receives a request for a data object in connection with an initial navigation. Thereafter, at 510, the wrapper looks up the data object in its local target map. If the target is found in the local map, at 515, then a source wrapper returns the target data object at 520. Otherwise, at 525, the wrapper asks a cached data object for a cached target data object for the navigation. In addition, the wrapper, at 530, asks a wrapper mapper for a wrapper of the cached target data object. The wrapper mapper then, at 535, looks up the cached target data object in its map. If the wrapper is found in the map at 540, the wrapper mapper, at 555, returns the target wrapper and at 560, the source wrapper, at 550 returns the target wrapper. If a wrappers is not found in the map at 545, then the wrapper mapper, at 545, creates a new wrapper for the cached target data object and then, at 550, stores the target wrapper in the wrapper map so that, at 55, the target wrapper can be returned by the wrapper mapper, and the source wrapper can subsequently, at 560, be returned the target wrapper.

The following is a sample program with annotated code as well as a sample output of such program that are useful for understanding and implementing the subject matter described herein.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

[0025] The following is a sample program with annotated code as well as a sample output of such program that are useful for understanding and implementing the subject matter described herein.

[0026] //WrapperTest.java package com.sap.example.test;

import java.util.HashSet;

import com.sap.example.api.IDataObject;
import com.sap.example.api.IDataObjectProvider;
import com.sap.example.api.IGraphInternalDataObject;
import com.sap.example.wrappers.WrapperMapper;

```
/**
 * Test program for the sample implementation for the wrapper mechanism.
 * This test program creates two sessions (instances of the WrapperMapper)
 * and adds some additional, session-local navigation paths to the second
 * session only. The session graph information is printed out for
 * both sessions. This shows how the session-local modifications only
 * affect the sesond session, while both sessions still use the common
 * information from the cached data.
 *
 * @author Oliver Goetz
 */
public class WrapperTest {

/**
     * Prints out the information for a given graph by printing out the
     * names of the data objects in the graphs and the listing of other
     * data objects each data object refers to.
     * @param startObject the data object where the graph starts
     * @param printedObjects used internally, set this to <code>null</code>
     * when calling the method.
     */
```

```java
  private static void printGraphInfo(IDataObject startObject, HashSet<IDataObject> printedObjects)
  {
    if (printedObjects==null)
      printedObjects = new HashSet<IDataObject>();
    if (printedObjects.contains(startObject))
      return;
    System.out.println(" Data Object '"+startObject.getName()+"'");
    IDataObject[] subObjects = startObject.getNavigationTargets();
    for (IDataObject subObject : subObjects) {
      System.out.println("   Sub-Object '"+subObject.getName()+"'");
    }
    System.out.println(" ----");
    printedObjects.add(startObject);
    for (IDataObject subObject : subObjects) {
      printGraphInfo(subObject, printedObjects);
    }
  }

/**
   * The main program
   */
  public static void main(String[] args) {
    // Create a session and print out graph
    IDataObjectProvider session1 = new
  WrapperMapper(CachedDataProvider.getCachedDataProvider());
    System.out.println("Session 1: Data Object Graph for Object 'A', no session-local additions.");
    System.out.println("----");
    printGraphInfo(session1.getGraphEntryDataObject("A"), null);
    System.out.println("====");
    System.out.println();

// Create a second session
    IDataObjectProvider session2 = new
  WrapperMapper(CachedDataProvider.getCachedDataProvider());
    // Add some session-local navigations from object B-->D, and from Object C-->B
    IGraphInternalDataObject objectB =
      session2.getGraphEntryDataObject("A").navigateToGraphInternalDataObject("B");
    IGraphInternalDataObject objectC =
      session2.getGraphEntryDataObject("A").navigateToGraphInternalDataObject("C");
    IGraphInternalDataObject objectD =
      objectC.navigateToGraphInternalDataObject("D");
    objectB.addNavigationPathInSession(objectD);
    objectC.addNavigationPathInSession(objectB);
    // Print out the graph for Session 2
```

```
    System.out.println("Session 2: Data Object Graph for Object 'A', with session-local
additions.");
    System.out.println("----");
    printGraphInfo(session2.getGraphEntryDataObject("A"), null);
    System.out.println("====");
    System.out.println();

// Now print out the graph for Session 1 again
    System.out.println("Session 1: Data Object Graph for Object 'A', no session-local
additions.");
    System.out.println("----");
    printGraphInfo(session1.getGraphEntryDataObject("A"), null);
    System.out.println("====");
    System.out.println();
    // The local additions to Session 2 are not visible in Session 1!
}

}
```

[0027]  //WrapperMapper.java package com.sap.example.wrappers;

import java.util.HashMap;

import com.sap.example.api.IDataObject;
import com.sap.example.api.IDataObjectProvider;
import com.sap.example.api.IGraphEntryDataObject;
import com.sap.example.api.IGraphInternalDataObject;

```
/**
 * Implements the control mechanism to provide wrapper objects for
 * application data objects, which are organised in a coherent graph.
 * @author Oliver Goetz
 */
public class WrapperMapper implements IDataObjectProvider {

/**
     * The source provider for the cached data objects.
     */
    private IDataObjectProvider sourceDataObjectProvider = null;

/**
     * The map with the wrappers for all data objects that are requested
     * within the session. Key is the cached data object, value is the
     * wrapper for that cached data object.
```

```
*/
private HashMap<IDataObject,AbstractDataObjectWrapper> wrapperMap = null;

/**
 * Constructor for the WrapperMapper.
 * @param aCachedDataObjectProvider the source provider for the cached
 * data objects.
 */
public WrapperMapper(IDataObjectProvider aCachedDataObjectProvider) {
  super();
  sourceDataObjectProvider = aCachedDataObjectProvider;
  wrapperMap = new HashMap<IDataObject,AbstractDataObjectWrapper>();
}

/* (non-Javadoc)
 * @see
com.sap.example.wrappers.IDataObjectProvider#getDataObject(java.lang.String)
 */
public IGraphEntryDataObject getGraphEntryDataObject(String
graphEntryObjectName) {
  IDataObject cachedDataObject =
sourceDataObjectProvider.getGraphEntryDataObject(graphEntryObjectName);
  return (IGraphEntryDataObject)getWrapper(cachedDataObject);
}

/**
 * Returns a wrapper for the given cached data object. If no such wrapper
 * is stored in the map, a new one is created and stored in the map.
 * @param cachedDataObject the cached data object for which a wrapper
 * object is requested.
 * @return the wrapper object for the given cached data object
 */
public AbstractDataObjectWrapper getWrapper(IDataObject cachedDataObject)
{
  AbstractDataObjectWrapper dataObjectWrapper = null;
  if (cachedDataObject!=null)
  {
    // Check in the wrapper map if a wrapper was already created for the
    // chached data object
    dataObjectWrapper = wrapperMap.get(cachedDataObject);
    if (dataObjectWrapper==null)
    {
      // No such wrapper was stored in the map
      // Create a new wrapper and store it in the map
```

```
      dataObjectWrapper = createWrapper(cachedDataObject);
      wrapperMap.put(cachedDataObject, dataObjectWrapper);
    }
  }
  return dataObjectWrapper;
}

/**
 * Creates a wrapper for the given cached data object. This method has
 * to decide which specific wrapper type is to be created depending
 * on the type of the cached data object.
 * @param cachedDataObject the cached data object for which a wrapper
 * is to be created
 * @return the newly created wrapper object with the correct type
 * for the given cached data object
 */
private AbstractDataObjectWrapper createWrapper(IDataObject cachedDataObject)
{
  if (cachedDataObject instanceof IGraphEntryDataObject)
  {
    return new GraphEntryDataObjectWrapper(cachedDataObject, this);
  }
  if (cachedDataObject instanceof IGraphInternalDataObject)
  {
    return new GraphInternalDataObjectWrapper(cachedDataObject, this);
  }
  throw new RuntimeException("Unknown entity type: "+cachedDataObject.getClass().toString());
}

}
```

[0028]   //AbstractCachedDataObject.java package com.sap.example.cached;

import java.util.HashMap;

import com.sap.example.api.IDataObject;
import com.sap.example.api.IGraphInternalDataObject;

```
/**
 * Abstract superclass for all cached data objects
 * @author Oliver Goetz
 */
public abstract class AbstractCachedDataObject implements IDataObject {
```

```
/**
 * The name of this cached data object
 */
private String dataObjectName;

/**
 * The map with the graph internal navigation targets of this
 * cached data object.
 */
private HashMap<String,IGraphInternalDataObject> subObjects;

/**
 * Constructur for cached data objects
 * @param dataObjectName the name of this data object
 */
public AbstractCachedDataObject(String dataObjectName) {
  super();
  this.dataObjectName = dataObjectName;
}

/* (non-Javadoc)
 * @see com.sap.example.api.IDataObject#getName()
 */
public String getName() {
  return dataObjectName;
}

/* (non-Javadoc)
 * @see
com.sap.example.api.IDataObject#navigateToGraphInternalDataObject(java.lang.String)
 */
public IGraphInternalDataObject navigateToGraphInternalDataObject(String targetDataObjectName) {
  if (null==subObjects)
  {
   return null;
  }
  else
  {
   return subObjects.get(targetDataObjectName);
  }
}

/* (non-Javadoc)
 * @see com.sap.example.api.IDataObject#getNavigationTargets()
```

```java
 */
public IGraphInternalDataObject[] getNavigationTargets() {
  if (null==subObjects)
    return new IGraphInternalDataObject[0];
  else
  {
   IGraphInternalDataObject[] targetArray =
     new IGraphInternalDataObject[subObjects.values().size()];
   subObjects.values().toArray(targetArray);
   return targetArray;
  }
}

/**
 * Adds a new navigation target to this cached data object.
 * @param subObject the target object to be added to the navigation targets.
 */
public void addNavigationTarget(IGraphInternalDataObject subObject)
{
  if (null==subObjects)
  {
    subObjects = new HashMap<String,IGraphInternalDataObject>();
  }
  subObjects.put(subObject.getName(), subObject);
 }
}
```

[0029]   //AbstractDataObjectWrapper.java package com.sap.example.wrappers;

import com.sap.example.api.IDataObject;

```java
/**
 * This is the abstract superclass for all type-specific wrapper class
 * implementations. It provides the storage for information about the
 * cached data object.
 * @author Oliver Goetz
 */
public abstract class AbstractDataObjectWrapper implements IDataObject {

/**
   * The reference to the cached data object
   */
  protected IDataObject cachedDataObject = null;
```

```java
/**
 * The reference to the WrapperMapper object
 */
protected WrapperMapper wrapperMapper = null;

/**
 * Constructor
 * @param aCachedDataObject the reference to the cached data object
 * @param aWrapperMapper the reference to the WrapperMapper object
 */
protected AbstractDataObjectWrapper(IDataObject aCachedDataObject,
WrapperMapper aWrapperMapper) {
  super();
  cachedDataObject = (IDataObject)aCachedDataObject;
  wrapperMapper = aWrapperMapper;
}

/* (non-Javadoc)
 * @see com.sap.example.api.IDataObject#getName()
 */
public String getName() {
  // The name is stored in the cached data object
  return cachedDataObject.getName();
}

}
```

[0030] //CachedGraphEntryDataObject.java

```java
package com.sap.example.cached;

import com.sap.example.api.IGraphEntryDataObject;

/**
 * Implementation of the cached graph entry data object.
 * @author Oliver Goetz
 */
public class CachedGraphEntryDataObject extends AbstractCachedDataObject
    implements IGraphEntryDataObject {

/**
   * Constructor for cached graph entry data ojects
   * @param dataObjectName the name of this data object
   */
  public CachedGraphEntryDataObject(String dataObjectName) {
    super(dataObjectName);
```

}

}

[0031] //CachedGraphInternalDataObject.java package com.sap.example.cached;

import com.sap.example.api.IGraphInternalDataObject;

/**
 * Implementation of the cached graph internal data object.
 * @author Oliver Goetz
 */
public class CachedGraphInternalDataObject extends AbstractCachedDataObject
    implements IGraphInternalDataObject {

/**
   * Constructor for cached graph internal data ojects
   * @param dataObjectName the name of this data object
   */
  public CachedGraphInternalDataObject(String dataObjectName) {
    super(dataObjectName);
  }

/* (non-Javadoc)
   * @see
com.sap.example.api.IGraphInternalDataObject#addNavigationPathInSession(com.sap.e
xample.api.IGraphInternalDataObject)
   */
  public void addNavigationPathInSession(IGraphInternalDataObject targetDataObject) {
    throw new RuntimeException("Cannot add session-local target to cached data object.");
  }

}

[0032] //CachedDataProvider.java package com.sap.example.test;

import java.util.HashMap;

import com.sap.example.api.IDataObjectProvider;
import com.sap.example.api.IGraphEntryDataObject;
import com.sap.example.cached.CachedGraphEntryDataObject;

```java
import com.sap.example.cached.CachedGraphInternalDataObject;

/**
 * This class is a sample implementation for a data object provider
 * that provides cached data. For this the provided content is
 * hard-coded. Of course, in a real application scenario the cached
 * data would be fetched from another data source (i.e. file system,
 * database, remote application server, etc.)
 * @author Oliver Goetz
 */
public class CachedDataProvider implements IDataObjectProvider {

/**
   * The singleton of the cached data provider
   */
  private static CachedDataProvider theCachedDataProvider = new
CachedDataProvider();

/**
   * Returns the cached data provider instance
   * @return the cached data provider instance
   */
  public static CachedDataProvider getCachedDataProvider()
  {
    return theCachedDataProvider;
  }

/**
   * The map where the caced data objects are stored.
   */
  private HashMap<String,IGraphEntryDataObject> dataObjectCache =
    new HashMap<String,IGraphEntryDataObject>();

/**
   * Constructor for the singleton
   */
  private CachedDataProvider() {
    super();
    initializeCache();
  }

/* (non-Javadoc)
   * @see
com.sap.example.api.IDataObjectProvider#getGraphEntryDataObject(java.lang.String)
   */
```

```
public IGraphEntryDataObject getGraphEntryDataObject(String
graphEntryObjectName) {
  return dataObjectCache.get(graphEntryObjectName);
}

/**
 * In tis example we just store a single graph in the cache.
 * In a real application an arbitrary number of graphs may be
 * stored.
 */
private void initializeCache()
{
  // Build up cached data:
  //
  //    A -+-> B
  //       '-> C -+-> D
  //              '-> E
  //
  // Where A is a graph entry object, and B, C, D, and E are internal graph objects
  CachedGraphEntryDataObject objectA = new CachedGraphEntryDataObject("A");
  CachedGraphInternalDataObject objectB = new CachedGraphInternalDataObject("B");
  CachedGraphInternalDataObject objectC = new CachedGraphInternalDataObject("C");
  CachedGraphInternalDataObject objectD = new CachedGraphInternalDataObject("D");
  CachedGraphInternalDataObject objectE = new CachedGraphInternalDataObject("E");
  objectA.addNavigationTarget(objectB);
  objectA.addNavigationTarget(objectC);
  objectC.addNavigationTarget(objectD);
  objectC.addNavigationTarget(objectE);
  dataObjectCache.put(objectA.getName(), objectA);
}
}
```

[0033] //GraphEntryDataObjectWrapper.java package com.sap.example.wrappers;

import com.sap.example.api.IDataObject;
import com.sap.example.api.IGraphEntryDataObject;
import com.sap.example.api.IGraphInternalDataObject;

/**
 * Wrapper class for graph entry data objects.
 * @author Oliver Goetz

```
*/
public class GraphEntryDataObjectWrapper extends AbstractDataObjectWrapper
    implements IGraphEntryDataObject {

/**
   * Constructor
   * @param aCachedDataObject the reference to the cached data object
   * @param aWrapperMapper the reference to the WrapperMapper object
   */
  public GraphEntryDataObjectWrapper(IDataObject aCachedDataObject,
      WrapperMapper aWrapperMapper) {
    super(aCachedDataObject, aWrapperMapper);
  }

/* (non-Javadoc)
   * @see
com.sap.example.api.IDataObject#navigateToGraphInternalDataObject(java.lang.String)
   */
  public IGraphInternalDataObject navigateToGraphInternalDataObject(
      String targetDataObjectName) {
    // First find the cached target data object by asking the cached data object wrapped by
this
    IGraphInternalDataObject cachedTarget =
cachedDataObject.navigateToGraphInternalDataObject(targetDataObjectName);
    // Now request a wrapper for the cached target from the WrapperMapper
    AbstractDataObjectWrapper wrapperForTarget =
wrapperMapper.getWrapper(cachedTarget);
    return (IGraphInternalDataObject)wrapperForTarget;
  }

/* (non-Javadoc)
   * @see com.sap.example.api.IDataObject#getNavigationTargets()
   */
  public IGraphInternalDataObject[] getNavigationTargets() {
    IGraphInternalDataObject[] cachedTargets =
cachedDataObject.getNavigationTargets();
    // Get wrappers for all the cached targets and return those
    IGraphInternalDataObject[] targetWrappers = new
IGraphInternalDataObject[cachedTargets.length];
    for (int i = 0; i < cachedTargets.length; i++) {
      targetWrappers[i] =
(IGraphInternalDataObject)wrapperMapper.getWrapper(cachedTargets[i]);
    }
    return targetWrappers;
  }
}
```

[0034]    //GraphInternalDataObjectWrapper.java package com.sap.example.wrappers;

import java.util.HashMap;

import com.sap.example.api.IDataObject;
import com.sap.example.api.IGraphInternalDataObject;

```java
/**
 * @author D037698
 *
 */
public class GraphInternalDataObjectWrapper extends AbstractDataObjectWrapper
    implements IGraphInternalDataObject {

/**
     * The map with the session-local graph internal navigation targets of
     * this data object wrapper.
     */
    private HashMap<String,IGraphInternalDataObject> additionalObjects;

/**
     * Constructor
     * @param aCachedDataObject the reference to the cached data object
     * @param aWrapperMapper the reference to the WrapperMapper object
     */
    public GraphInternalDataObjectWrapper(IDataObject aCachedDataObject,
        WrapperMapper aWrapperMapper) {
      super(aCachedDataObject, aWrapperMapper);
    }

/* (non-Javadoc)
     * @see
    com.sap.example.wrappers.AbstractDataObjectWrapper#navigateToGraphInternalDataO
    bject(java.lang.String)
     */
    public IGraphInternalDataObject navigateToGraphInternalDataObject(String
    targetDataObjectName) {
      // Override to merge in the navigation to the session-local navigation targets
      // First check the local map
      if (null!=additionalObjects)
      {
```

```
    IGraphInternalDataObject targetObject =
additionalObjects.get(targetDataObjectName);
        if (null!=targetObject)
            return targetObject;
    }
    // No local target found, try the cached one
    // First find the cached target data object by asking the cached data object wrapped by this
    IGraphInternalDataObject cachedTarget =
cachedDataObject.navigateToGraphInternalDataObject(targetDataObjectName);
    // Now request a wrapper for the cached target from the WrapperMapper
    AbstractDataObjectWrapper wrapperForTarget =
wrapperMapper.getWrapper(cachedTarget);
    return (IGraphInternalDataObject)wrapperForTarget;
}

/* (non-Javadoc)
 * @see com.sap.example.api.IDataObject#getNavigationTargets()
 */
public IGraphInternalDataObject[] getNavigationTargets() {
    IGraphInternalDataObject[] cachedTargets =
cachedDataObject.getNavigationTargets();
    // The result array needs room for the locally added targets
    IGraphInternalDataObject[] targetWrappers =
        new
IGraphInternalDataObject[cachedTargets.length+(additionalObjects!=null?additionalObjects.size():0)];
    // Get wrappers for all the cached targets
    for (int i = 0; i < cachedTargets.length; i++) {
        targetWrappers[i] =
(IGraphInternalDataObject)wrapperMapper.getWrapper(cachedTargets[i]);
    }
    // If there are additional targets, add them to the array
    if (null!=additionalObjects)
    {
        Object[] additionalTargets = additionalObjects.values().toArray();
        System.arraycopy(additionalTargets, 0, targetWrappers, cachedTargets.length, additionalTargets.length);
    }
    return targetWrappers;
}

/* (non-Javadoc)
 * @see
com.sap.example.api.IGraphInternalDataObject#addNavigationPathInSession(com.sap.example.api.IGraphInternalDataObject)
```

```
*/
public void addNavigationPathInSession(
    IGraphInternalDataObject targetDataObject) {
  // Make sure not to add one that is already in the cached targets
  if
(null==cachedDataObject.navigateToGraphInternalDataObject(targetDataObject.getNam
e()))
    {
      if (null==additionalObjects)
      {
        additionalObjects = new HashMap<String,IGraphInternalDataObject>();
      }
      additionalObjects.put(targetDataObject.getName(), targetDataObject);
    }
  }

}
```

[0035]   //IDataObject.java package com.sap.example.api;

```
/**
 * Superinterface for all data objects.
 * @author Oliver Goetz
 */
public interface IDataObject {

/**
   * Returns the name of this data object. The name identifies
   * this data object uniquely within a defined scope (i.e.
   * if the data object graph is organized in a hierarchical
   * structure it might be defined that the object names
   * are unique only among the sub-objects with the same type
   * of a given parent node).
   *
   * @return the name of this data object
   */
  String getName();

/**
   * Returns another graph internal data object with the given name
   * for which a navigation path is defined in this object.
   * @param targetDataObjectName the name of the data object which is the
   * target of the naviagtion
   * @return the target data object
```

```
*/
IGraphInternalDataObject navigateToGraphInternalDataObject(String
targetDataObjectName);

/**
 * Returns an array with all internal data objects that can be
 * navigated to from this data object.
 * @return an array with the navigation targtes
 */
IGraphInternalDataObject[] getNavigationTargets();
}
```

[0036]   //IDataObjectProvider.java

```
package com.sap.example.api;

/**
 * Provider interface for application data graphs; an implentation provides
 * access to an application data graphs by identifying a
 * {@link com.sap.example.api.IGraphEntryDataObject} which is the starting
 * point for navigation inside a coherent graph of application data.
 * @author Oliver Goetz
 */
public interface IDataObjectProvider {

/**
     * Returns the graph entry object with the given name
     * @param graphEntryObjectName the name of the graph entry object.
     * @return the graph entry object with the given name
     */
    IGraphEntryDataObject getGraphEntryDataObject(String graphEntryObjectName);
}
```

[0037]   //IGraphEntryDataObject.java

```
package com.sap.example.api;

/**
 * Interface for graph entry data objects
 * @author Oliver Goetz
 */
public interface IGraphEntryDataObject extends IDataObject {
}
```

[0038]   //IGraphInternalDataObject.java

```
package com.sap.example.api;

/**
 * Interface for data objects within a given data object graph
 * @author Oliver Goetz
 */
public interface IGraphInternalDataObject extends IDataObject {

/**
     * Returns another graph internal data object with the given name
     * for which a navigation path is defined in this object.
     * @param targetDataObjectName the name of the data object which is the
     * target of the naviagtion
     * @return the target data object
     */
    IGraphInternalDataObject navigateToGraphInternalDataObject(String targetDataObjectName);

/**
     * Adds a navigation path from this data object to the given target data
     * object. This navigation path will only be visible within the session.
     * @param targetDataObject the target data object for the navigation path
     */
    void addNavigationPathInSession(IGraphInternalDataObject targetDataObject);

}
```

[0039] The following is a sample output from WrapperTest.java with the data added locally in a second session in bold face font type.

Session 1: Data Object Graph for Object 'A', no session-local additions.

----

Data Object 'A'

Sub-Object 'C'

Sub-Object 'B'

----

Data Object 'C'

Sub-Object 'D'

Sub-Object 'E'

----

Data Object 'D'

----

Data Object 'E'

----

Data Object 'B'

----

===

Session 2: Data Object Graph for Object 'A', with session-local additions.

----

Data Object 'A'

Sub-Object 'C'

Sub-Object 'B'

----

Data Object 'C'

Sub-Object 'D'

Sub-Object 'E'

Sub-Object 'B'

----

Data Object 'D'

----

Data Object 'E'

----

Data Object 'B'

Sub-Object 'D'

----

===

Session 1: Data Object Graph for Object 'A', no session-local additions.

----

Data Object 'A'

Sub-Object 'C'

Sub-Object 'B'

----

Data Object 'C'

Sub-Object 'D'

Sub-Object 'E'

----

Data Object 'D'

````
----
Data Object 'E'
----
Data Object 'B'
----
====
````

What is claimed is:

1. An article comprising a non-transitory readable medium encoding instructions which are operable to cause at least one apparatus to perform operations comprising:
   receiving, by a wrapper, a request for application data, the wrapper storing a first reference to a cross-session object and a second reference to a wrapper mapper object, the cross-session object being utilized with a plurality of sessions, the wrapper mapper object being utilized by an application in a server environment with a plurality of concurrent sessions, the wrapper mapper object including a map with all cross-session data objects for which a wrapper has been created as a key and the created wrappers as a value;
   accessing the cross-session object using the first reference; and
   polling the wrapper mapper object using the second reference to access a session-local object, the session-local object differing from the cross-session object and being utilized by a single session associated with the wrapper.

2. An article as in claim 1, wherein the polling comprises:
   returning, by the wrapper mapper object, a data object wrapper referencing the session-local object; and
   accessing the session-local object using the data object wrapper.

3. An article as in claim 2, wherein the wrapper mapper object comprises a map associating session-local objects with references.

4. An article as in claim 1, wherein the polling comprises:
   determining that a data object wrapper associated with the second reference does not exist;
   generating a data object wrapper storing the session-local object;
   returning, by the wrapper mapper object, the data object wrapper; and
   accessing the session-local object using the data object wrapper.

5. An article as in claim 1, wherein the application data is non-volatile application data.

6. An article as in claim 1, wherein the application data is metadata.

7. A method of handling a plurality of concurrent sessions at a server, the method comprising:
   receiving, by a wrapper, a request for application data, the wrapper storing a first reference to a cross-session object and a second reference to a wrapper mapper object, the cross-session object being utilized with a plurality of sessions, the wrapper mapper object being utilized by an application in a server environment with a plurality of concurrent sessions, the wrapper mapper object including a map with all cross-session data objects for which a wrapper has been created as a key and the created wrappers as a value;
   accessing the cross-session object using the first reference; and
   polling the wrapper mapper object using the second reference to access a session-local object, the session-local object differing from the cross-session object and being utilized by a single session associated with the wrapper.

8. A method as in claim 7, wherein the polling comprises:
   returning, by the wrapper mapper object, a data object wrapper referencing the session-local object; and
   accessing the session-local object using the data object wrapper.

9. A method as in claim 8, wherein the wrapper mapper object comprises a map associating session-local objects with references.

10. A method as in claim 7, wherein the polling comprises:
    determining that a data object wrapper associated with the second reference does not exist;
    generating a data object wrapper storing the session-local object;
    returning, by the wrapper mapper object, the data object wrapper; and
    accessing the session-local object using the data object wrapper.

11. A method as in claim 7, wherein the application data is non-volatile application data.

12. A method as in claim 7, wherein the application data is metadata.

13. A computer-implemented method comprising:
    receiving, by a wrapper mapper object, a request for a first business object, the wrapper mapper object being utilized by an application in a server environment with a plurality of concurrent sessions, the wrapper mapper object including a map with all cross-session data objects for which a wrapper has been created as a key and the created wrappers as a value, the first business object being part of a shared mapped cache that further includes a second business object, the first business object being linked to the second business object, both of the first business object and the second business object respectively including a plurality of nodes;
    retrieving, in response to the request for the first business object, a reference to the first business object;
    checking contents of the wrapper mapper object to determine if there is a wrapper for the first business object;
    creating the wrapper and storing a reference to the wrapper in a map within the wrapper mapper object if it is determined that there is not a wrapper for the first business object;
    returning, by the wrapper mapper object, a reference to the wrapper for the first business object;
    receiving, by the wrapper, a request for data from one of the plurality of nodes of the first business object;
    accessing a wrapped reference in the wrapper to obtain a reference to the requested node of the first business object;
    polling the wrapper mapper object to obtain a node wrapper for the requested node of the first business object;
    checking a map within the wrapper mapper object to determine if the node wrapper has already been created;
    creating the node wrapper and storing a reference to the node wrapper in the map within the wrapper mapper object if it is determined that there is not a node wrapper for the requested node of the first business object; and
    returning, by the wrapper mapper object, a reference to the node wrapper for the requested node in the first business object.

14. A method as in claim 13, wherein the wrapper mapper object is a first wrapper mapper object and wherein there is a second wrapper mapper object, the first wrapper mapper object forming part of a first session of the application and the second wrapper mapper object forming part of a second session of the application, the second wrapper mapper object having a second wrapper which contains a second node wrapper referencing nodes of the second business object.

15. A method as in claim 14, further comprising:
    creating, in the second session, a third wrapper referencing the first business object and a third node wrapper referencing at least one node of the first business object when data from the first business object is required in the second session.

* * * * *